(No Model.)
W. H. WEST.
CULTIVATOR.
No. 266,238. Patented Oct. 17, 1882.
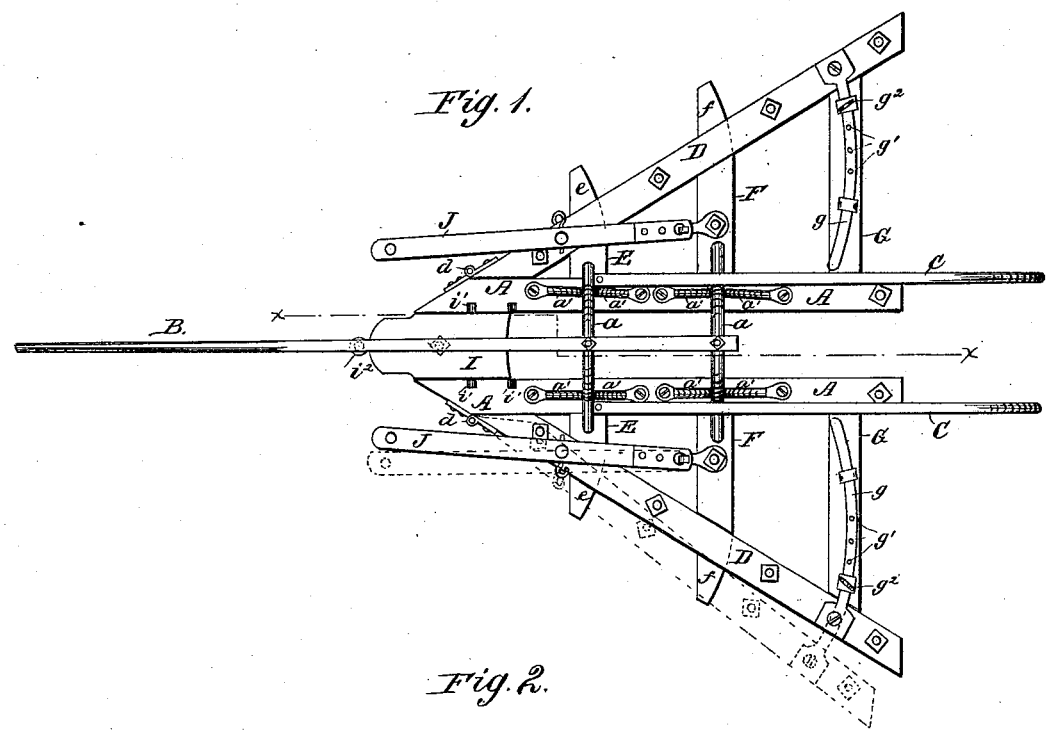
Fig. 1.
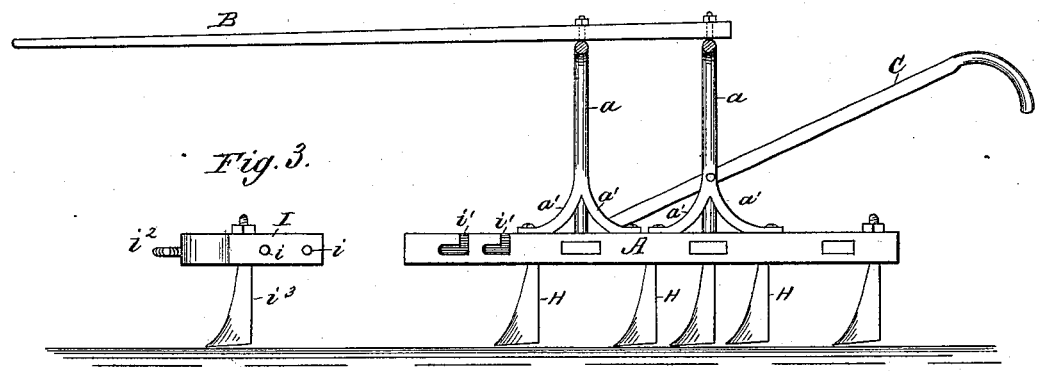
Fig. 2.
Fig. 3.
WITNESSES:
W. W. Hollingsworth
John C. Kennon
INVENTOR:
Wm. H. West
BY
ATTORNEYS.
N. PETERS, Photo-Lithographer, Washington, D. C.

UNITED STATES PATENT OFFICE.

WILLIAM H. WEST, OF GRAND ISLAND, NEBRASKA.

CULTIVATOR.

SPECIFICATION forming part of Letters Patent No. 266,238, dated October 17, 1882.

Application filed March 13, 1882. (No model.)

*To all whom it may concern:*

Be it known that I, W. H. WEST, of Grand Island, Hall county, State of Nebraska, have invented a new and Improved Cultivator; and I do hereby declare that the following is a full, clear, and exact description of the same, reference being had to the accompanying drawings, forming part of this specification, in which—

Figure 1 is a plan or top view. Fig. 2 is a longitudinal section on line $x\ x$, Fig. 1. Fig. 3 is a detail view of the block.

This invention has for its object the production of a cultivating implement which shall be adapted for several distinct purposes—that is, the preparing of land for grain and the cultivation of corn in all its various stages; and it consists mainly, first, in the special construction of parts by means of which the implement is adapted to cultivate corn two rows at once; and, second, in the combination, with the double cultivator, of a head-block of special construction, by means of which the implement is adapted for preparing land for grain, as will be fully described hereinafter.

In the drawings, A A represent the inner beams of the cultivator, lying parallel to each other, as shown, which are strongly secured together by the U-shaped rods $a\ a$, having the feet $a'\ a'$ diverging from each other to extend the base of support and give the necessary stability to the structure.

B represents the tongue, the rear end of which is strongly secured to the horizontal portion of the rods $a$ by bolts or in any other suitable manner.

C C represent the handles, which are secured at their front ends to the forward ends of the beams A A, and at a suitable distance from the ends of the rods $a$, as shown.

D D represent the outside beams, set at an angle to the inner beams, as shown, and united thereto at their front ends by means of a hinge-joint, $d$.

E E, F F, and G G represent transverse beams of gradually-increasing length, by means of which the inner and outer beams are united together to form a frame for the cultivator-teeth.

$e$ and $f$ represent tenons on the beams E and F, which pass through slots in the beam D, as shown.

$g$ represents a bar, secured at one end to the beam D, which bar passes through keepers secured to the upper surface of the transverse beam G, and is provided with a series of holes, $g'$, as shown.

$g^2$ represents a pin, which is adapted to pass through an opening in one of the keepers and one of the openings, $g'$, in the bar into an opening in the beam G, for the purpose of securing the bar in any desired position.

H H represent cultivator-teeth, of the usual well-known or any other form, which are located on the frame at suitable points, as shown. By means of the described construction a double implement is produced which is capable of cultivating two rows of corn at once.

I represents a block of a form to fit between the forward ends of the inner beams, A A, and is provided upon its sides with the studs or pins $i\ i$, as shown.

$i'\ i'$ represent L-shaped recesses, formed in the inner faces of the beams A A near their front ends, the vertical portions of which extend through the beam to the upper side, as shown.

$i^2$ represents a draft-eye located at the front end of the block, by means of which the team is attached to the cultivator when the block is in place.

$i^3$ represents a removable tooth, which is secured to the block by a nut or in any other suitable manner. This block I may be attached to the cultivator, when desired, by simply causing the pin $i$ to descend in the vertical portion of the recesses $i'$ until the horizontal portions are reached, and then drawing the block forward until the front pins bear against the front wall of the recess. The block may be readily removed, when desired, by reversing this operation.

J J represent removable draft-bars, located on the frames at any proper point, which are adapted for employment in place of the draft-eye of the head-block I when the latter is removed from the cultivator.

The operation is substantially as follows: When it is desired to use the implement for preparing land for grain the head-block, with its tooth in place, is secured to the cultivator. When it is desired to cultivate young corn the removable tooth of the head-block is taken out to permit the cultivator to straddle the row of corn and cultivate each side thereof. When the corn has grown to such a height that the block interferes with it the block is then to be removed from the implement. Space is thus afforded for the corn until it reaches the stage when it does not require cultivation.

By means of the hinge-joint $d$ and the beams E F G, with the tenons $e\ f$ and adjusting-bar $g$, provision is made for adjusting the outside beams, D D, to cultivate a wider or narrower space, as may be desired.

By means of the described construction two rows of corn are cultivated with about the same expenditure of labor as is usually required for one.

The implement is also adapted for cultivating corn in all its various stages and for preparing land for grain.

Having thus described my invention, what I claim, and desire to secure by Letters Patent, is—

1. The combination, with the inner beams, A, united by rods $a$, of the slotted outer beams, D, hinged to the beams A, the transverse beams E F G, secured to the inner beams and working in the slots of the hinged beams, and means for securing the hinged beams to the transverse beams, substantially as and for the purpose set forth.

2. In combination with a double cultivator, substantially as described, a removable head-block, I, as and for the purpose set forth.

3. In combination with the cultivator-beams A A, having the recesses $i'\ i'$, the head-block I, with pins $i\ i$, as described.

4. The combination, with the hinged beams D and the transverse beams F of the two frames, of the detachable draft-bars J, substantially as and for the purpose set forth.

5. The cultivator described, having the inner beams, A A, united by the arched rods $a\ a$, the outer beams, D D, with capacity for lateral adjustment, the beams E F G, and the head-block I, substantially as set forth.

WILLIAM H. WEST.

Witnesses:
A. A. ABBOTT,
T. T. BELL.